United States Patent
Kato

(10) Patent No.: US 10,776,056 B2
(45) Date of Patent: Sep. 15, 2020

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Hisashi Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/958,668

(22) Filed: Dec. 3, 2015

(65) Prior Publication Data

US 2016/0162227 A1 Jun. 9, 2016

(30) Foreign Application Priority Data

Dec. 9, 2014 (JP) ................................ 2014-249438

(51) Int. Cl.
*G06F 3/12* (2006.01)

(52) U.S. Cl.
CPC .......... *G06F 3/1227* (2013.01); *G06F 3/1206* (2013.01); *G06F 3/1291* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 2005/0229104 A1* | 10/2005 | Franco | ................ | G06F 9/44526 715/743 |
| 2010/0250738 A1* | 9/2010 | Nagatani | ............. | H04L 41/0806 709/224 |
| 2012/0147422 A1* | 6/2012 | Honma | ................ | G06F 3/1208 358/1.15 |
| 2014/0045430 A1* | 2/2014 | Kim | ........................ | H04B 7/26 455/41.2 |
| 2014/0078541 A1* | 3/2014 | Takano | ................ | G06F 3/1203 358/1.14 |
| 2016/0057602 A1* | 2/2016 | Rayanki | ................ | H04W 8/005 370/254 |
| 2016/0128119 A1* | 5/2016 | Maheshwari | ....... | H04W 76/023 370/329 |
| 2017/0134927 A1* | 5/2017 | Lee | ........................ | H04W 8/005 |

FOREIGN PATENT DOCUMENTS

JP H11345102 A 12/1999

\* cited by examiner

*Primary Examiner* — Fan Zhang
(74) *Attorney, Agent, or Firm* — Canon U.S.A., Inc. IP Division

(57) ABSTRACT

An information processing apparatus manages whether each of a plurality of print plug-ins is in an enabled state or in a disabled state, the plurality of print plug-ins adding at least a search function to an operating system operating on the information processing apparatus, and, if a search for a printer is instructed and the plurality of print plug-ins includes a print plug-in in the disabled state, performs a search for a printer by a print plug-in in the enabled state, and displays a detection result and a setting screen for setting the print plug-in in the disabled state to the enabled state.

31 Claims, 15 Drawing Sheets

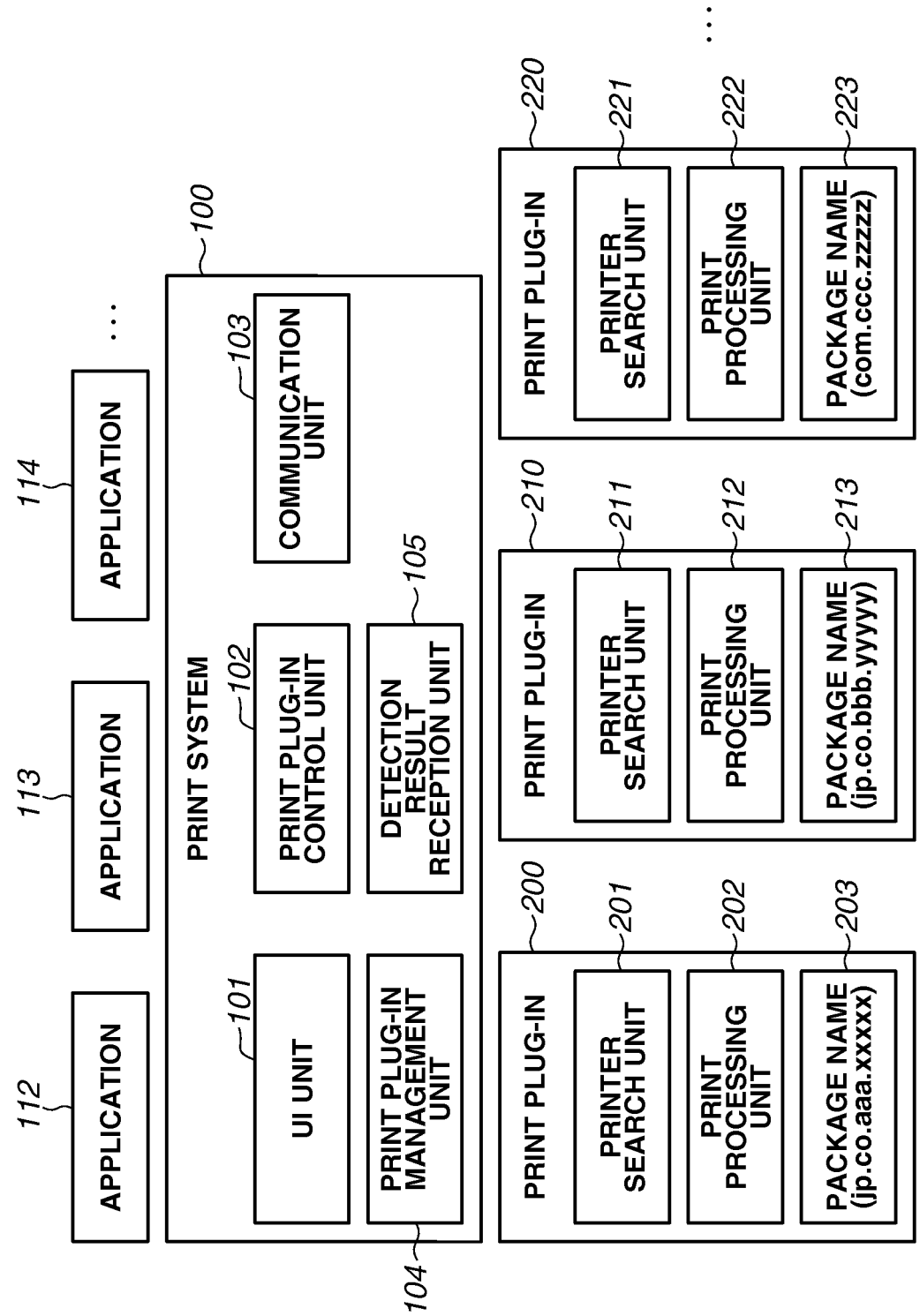

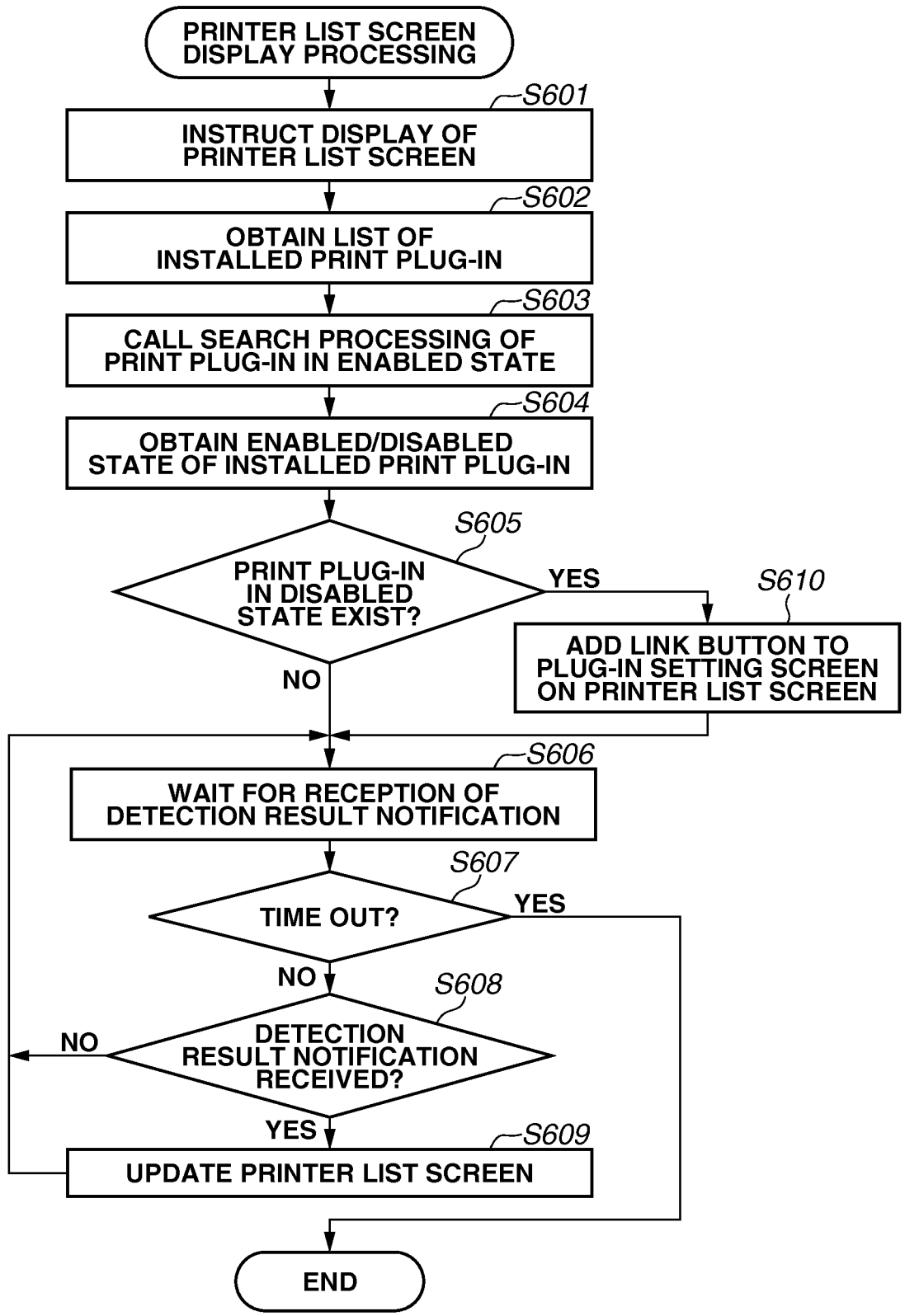

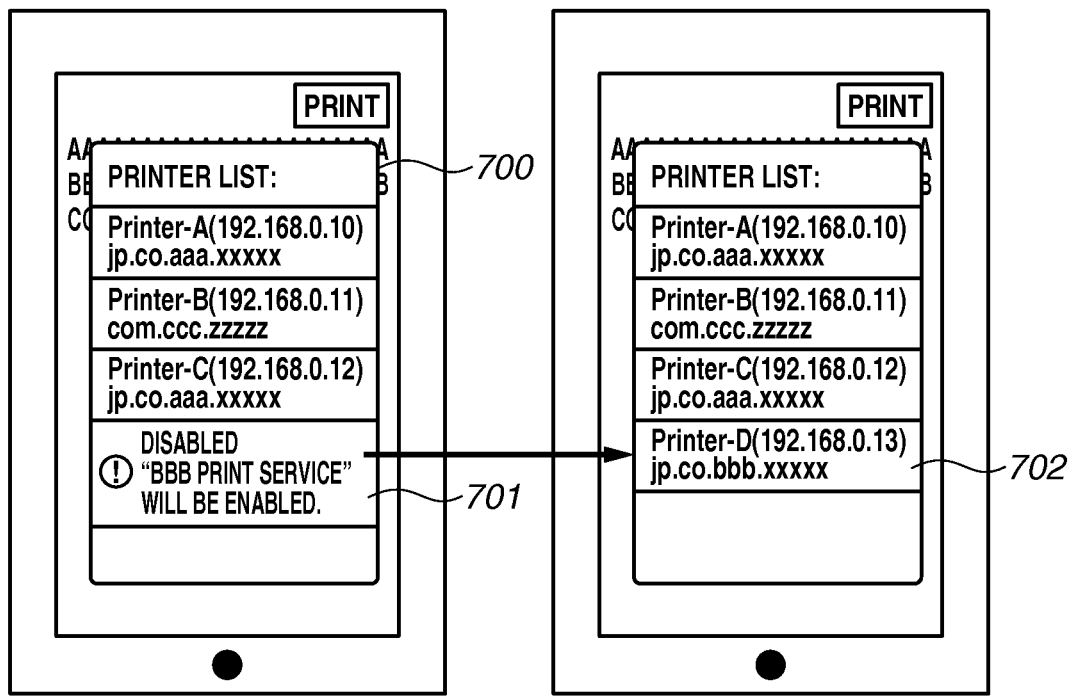

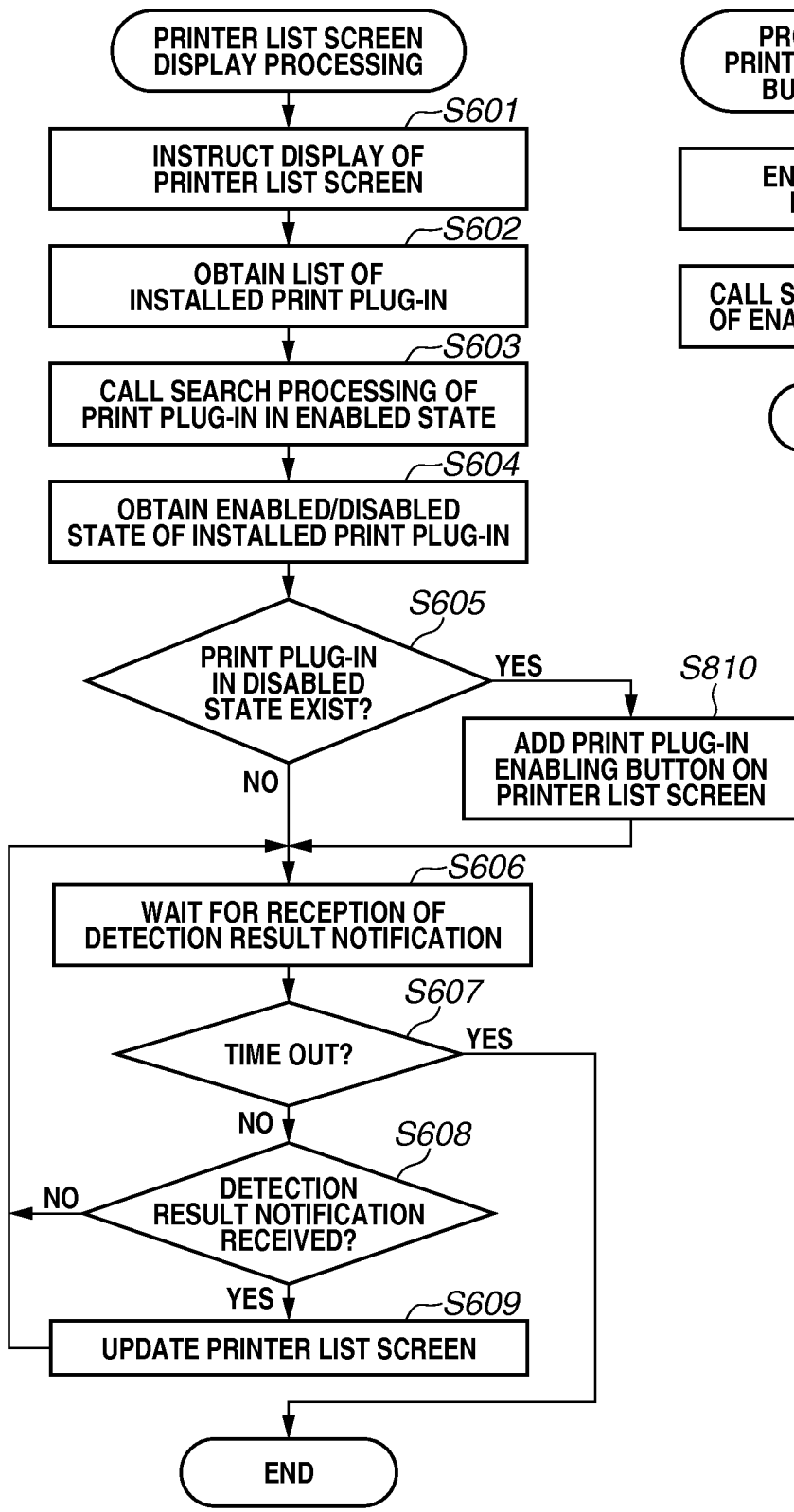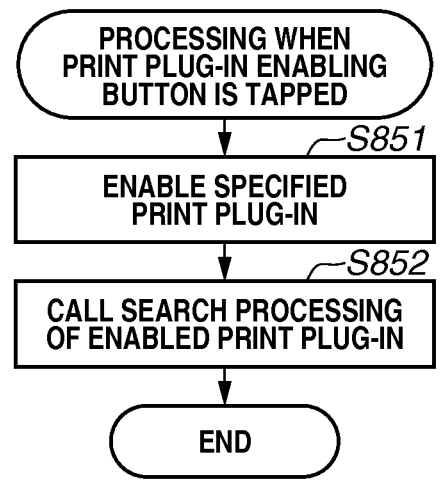

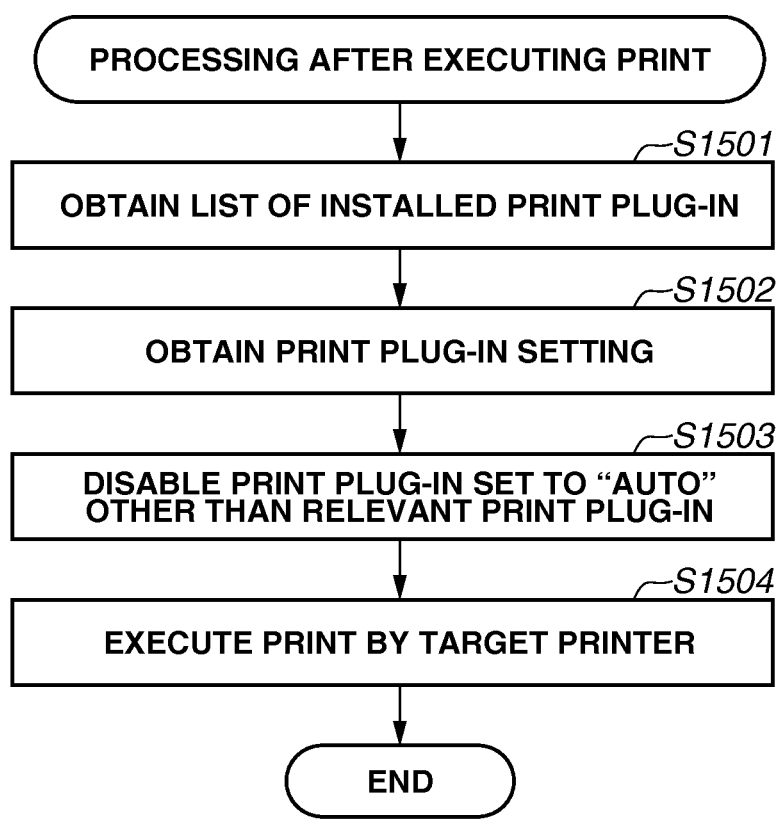

INFORMATION PROCESSING APPARATUS, CONTROL METHOD, AND STORAGE MEDIUM

BACKGROUND OF THE INVENTION

Field of the Invention

The present invention relates to a technique for controlling a print plug-in.

Description of the Related Art

Conventionally, techniques for performing printing by printers on networks have been discussed.

Japanese Patent Application Laid-Open No. 11-345102 describes a technique for searching for printers connected to a network and performing output to a printer in an available state in the searched printers.

However, according to the technique described in Japanese Patent Application Laid-Open No. 11-345102, a single printer driver searches for printers and performs output to the printer. Generally, printer models that the printer driver can correspond to are limited to printers of a single vender.

SUMMARY OF THE INVENTION

According to the present invention, an information processing apparatus includes a management unit configured to manage whether each of a plurality of print plug-ins is in an enabled state or in a disabled state, the plurality of print plug-ins adding at least a search function to an operating system operating on the information processing apparatus, and a display unit configured to, if a search for a printer is instructed, search for a printer by a print plug-in in the enabled state among the plurality of print plug-ins and display a detection result of a printer, wherein, if a search for the printer is instructed and the plurality of print plug-ins includes a print plug-in in the disabled state, the display unit displays a setting screen for setting the print plug-in in the disabled state to the enabled state.

Further features of the present invention will become apparent from the following description of exemplary embodiments with reference to the attached drawings.

BRIEF DESCRIPTION OF THE DRAWINGS

FIG. 3 illustrates a software configuration of the print system and the print plug-in.

FIG. 6 is a flowchart illustrating printer list display processing according to the first exemplary embodiment.

FIGS. 7A and 7B illustrate an example of screen transition according to a second exemplary embodiment.

FIGS. 8A and 8B are flowcharts illustrating printer list display processing according to the second exemplary embodiment.

FIG. 15 is a flowchart illustrating processing performed after executing print according to the fourth exemplary embodiment.

DESCRIPTION OF THE EMBODIMENTS

Examples of exemplary embodiments of the present invention will be described in detail below with reference to the attached drawings.

Figure 1:
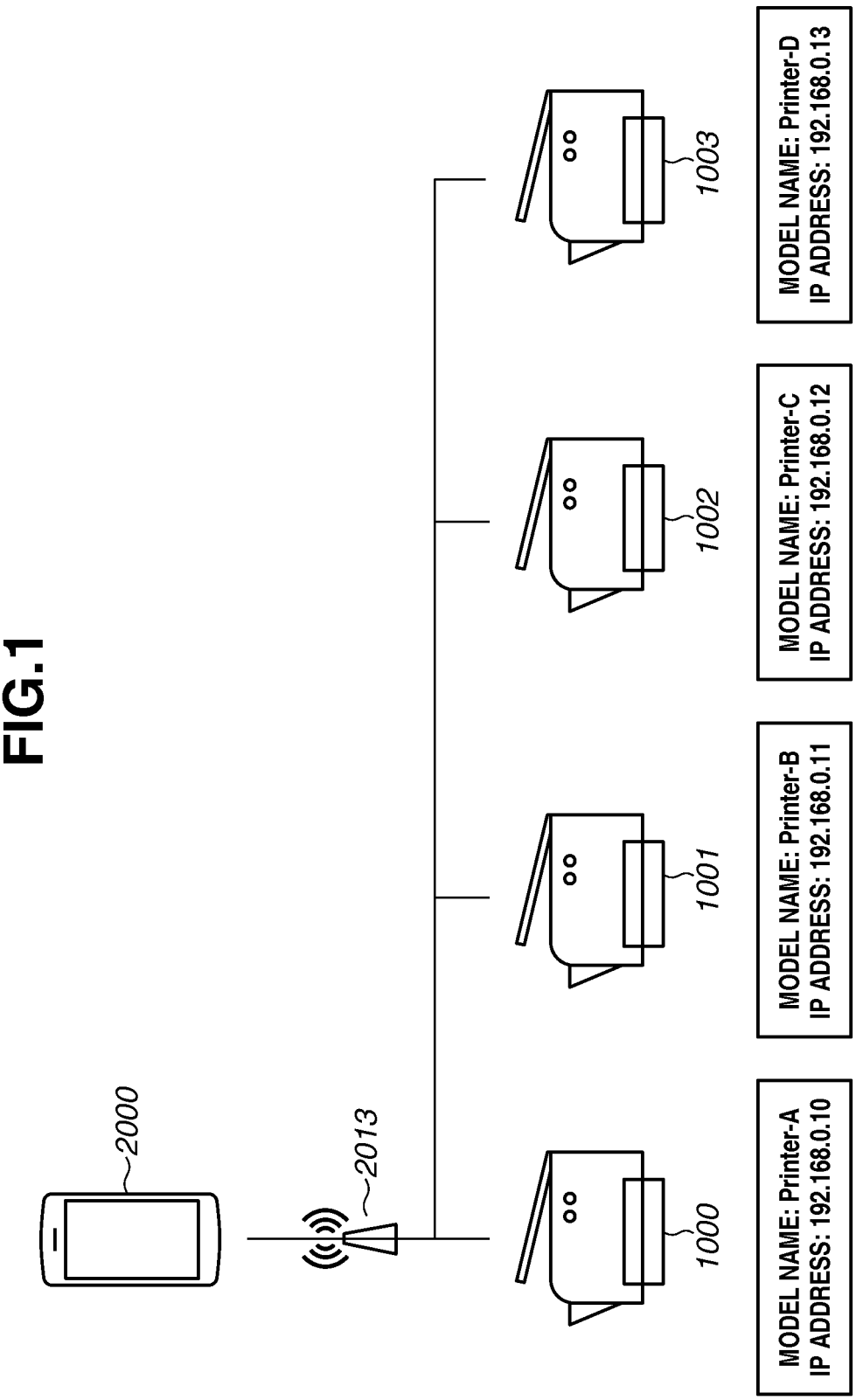
FIG. 1 illustrates a network configuration according to an exemplary embodiment.

FIG. 1 illustrates a network configuration according to the present exemplary embodiment. A portable terminal 2000 as an example of an information processing apparatus is connected via an access point 2013 to the same network to which a printer 1000, a printer 1001, a printer 1002, and a printer 1003 are connected. Each printer internally stores a model name and an Internet protocol (IP) address indicated in FIG. 1.

Figure 2:
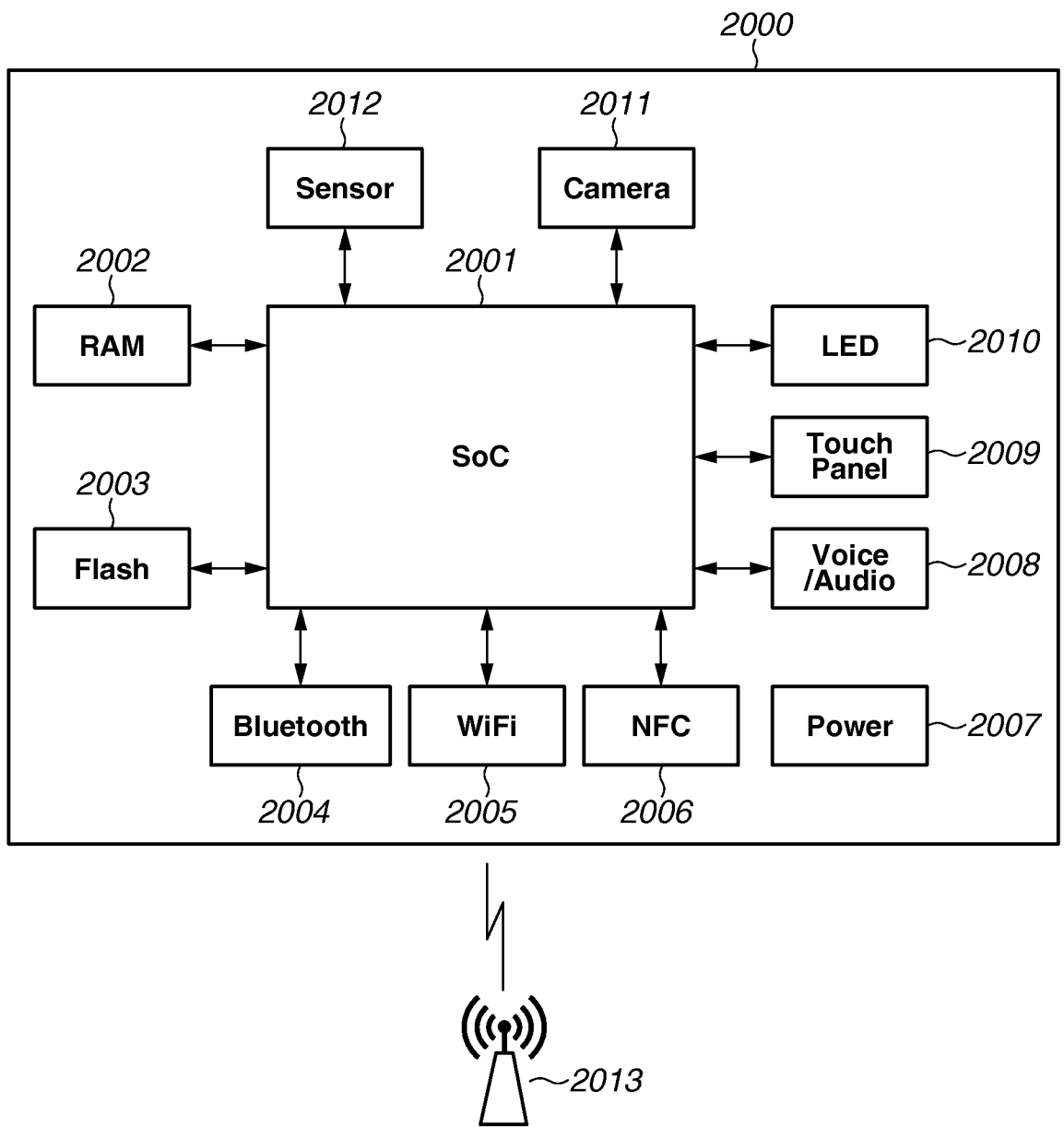
FIG. 2 illustrates a hardware configuration in which a print system and a print plug-in are operated.

FIG. 2 illustrates an example of a hardware configuration of the portable terminal 2000. A flash memory 2003 stores various programs. An execution subject on the hardware is a system on a chip (SoC) 2001, and a control subject on the software is the programs stored in the flash memory 2003. A near field communication (NFC) unit 2006 is a communication unit which performs short-range wireless communication. A wireless fidelity (WiFi) unit 2005 performs wireless communication via the access point 2013. A Bluetooth (registered trademark) unit 2004 performs communication by Bluetooth (registered trademark). A random access memory (RAM) 2002 is used to expand a program, and the SoC 2001 interprets and executes the program. A power source 2007 supplies necessary power to each unit within the portable terminal 2000. A Voice/Audio unit 2008 includes a microphone, a speaker, and the like and is used for audio input and output. A touch panel 2009 is an operation input unit operated by a user with his/her finger. A light emitting diode (LED) 2010 is used for various types of display. A camera unit 2011 includes an image capturing unit for capturing a photograph and a moving image, and the like. A sensor unit 2012 includes a global positioning system (GPS), an acceleration sensor, a geomagnetic sensor, a proximity sensor, and the like. Each unit is connected to the SoC 2001, and the portable terminal 2000 can be connected to the network via the access point 2013. According to the present exemplary embodiment, an operating system (OS) is assumed as, for example, the Android OS (registered trademark) developed by Google, however the OS is not limited to the Android OS.

With reference to FIG. 3, a software configuration operating on the portable terminal 2000 is described. The software program is stored in the flash memory 2003. Applications 112 to 114 are installed in the portable terminal 2000 and have functions of displaying and printing contents such as pictures, documents, and web pages which are executed via a print system 100. The print system 100 is a part of a framework of the operating system and includes a user interface (UI) unit 101, a print plug-in control unit 102, a communication unit 103, a print plug-in management unit 104, and a detection result reception unit 105. The UI unit 101 provides a user interface of the print system 100. The print plug-in control unit 102 controls operations of a print plug-in installed in the portable terminal 2000. The print plug-in is installed in the portable terminal 2000 and adds at least a search function of searching for a printer to the OS operating on the portable terminal 2000. The communication unit 103 performs network communication with a printer using WiFi. The print plug-in management unit 104 manages information of the print plug-in installed in the portable terminal 2000. The detection result reception unit 105 receives a detection result notification when the print plug-in detects a printer on the network.

Print plug-ins 200, 210, and 220 have functions of searching a printer, generating a print job, obtaining a printer status, and the like, and serve as a bridge between the print system 100 and a target printer. Each plug-in can be installed and uninstalled as necessary, and the print plug-in management unit 104 manages an installation state of each plug-in.

Each print plug-in has similar configuration, and thus, the print plug-in 200 is described below. A printer search unit 201 searches for a printer on the network using multicast or broadcast. For a protocol, the Service Location Protocol (SLP) Multicast-Domain Name System (DNS) and others are used. However, the protocol is not limited to the above one and may be different in each plug-in. A print processing unit 202 performs rendering processing on page description language (PDL) data or image data which can be printed by the printer 1001. A package name 203 is a unique name, for example "jp.co.aaa.xxxxx", assigned to the print plug-in 200. A different package name is assigned to each print plug-in and stored.

Figure 4A:
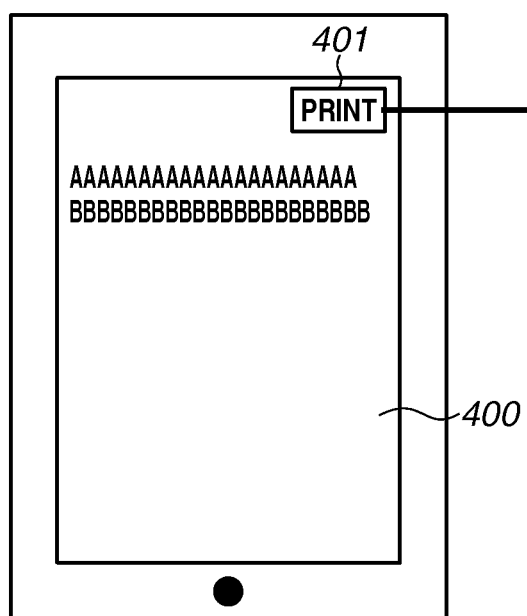
FIGS. 4A and 4B illustrate an example of a print screen on an application according to the present exemplary embodiment.
Figure 4B:
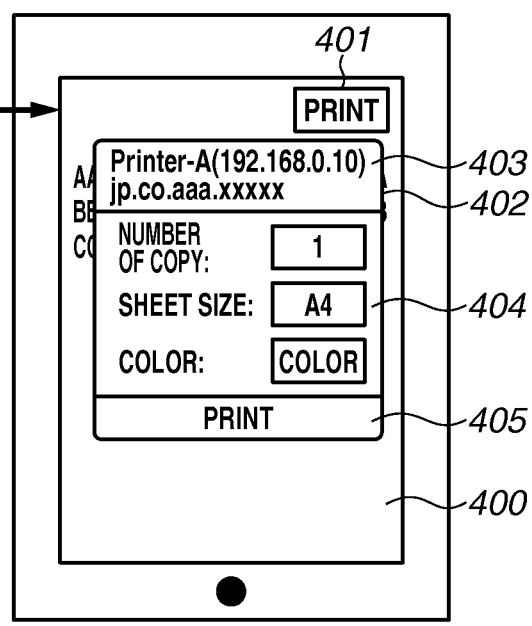

FIGS. 4A and 4B each illustrate an example of a display screen of the application implementing functions of the print system 100. When a user taps a print button 401 on an application screen 400 displaying a print target content, the UI unit 101 of the print system 100 is called, and a print setting screen 402 is displayed. The print setting screen 402 includes a target printer display area 403, a print setting area 404, and a print button 405. When a user determines desired print settings in the print setting area 404 and taps the print button 405, content data of the application is output to the printer displayed on the target printer display area 403. FIG. 4B illustrates an example in which a printer "Printer-A" having an IP address "192.168.0.10" is selected. If the output destination is to be changed to a different printer, a user taps the target printer display area 403, and a printer list screen described below is displayed. On the printer list screen, model names of printers are displayed together with the package names of the print plug-ins and presented as selection candidates to a user.

According to a first exemplary embodiment, a method is described which displays, on the printer list screen, a link button for displaying a print plug-in setting screen on which the installed print plug-in can be set to the enabled state or the disabled state and thus enables the disabled print plug-in.

A user can instructs a search for a printer by tapping the target printer display area 403 on the print setting screen 402 illustrated in FIG. 4B. FIG. 6 is a flowchart illustrating an example of operations of the print system 100 performed after the search for the printer is instructed.

The processing described according to the present exemplary embodiment is realized by loading a program stored in the flash memory 2003 to the RAM 2002 and executing the program by the SoC 2001.

First, in step S601, the target printer display area 403 is tapped on the print setting screen 402. Then, in step S602, the print plug-in control unit 102 obtains a list of the print plug-ins installed in the portable terminal 2000 via the print plug-in management unit 104.

Next, in step S603, the print plug-in control unit 102 calls the printer search unit of the print plug-in set in the enabled state among all of the installed print plug-ins. In step S603, the printer search unit of each print plug-in in the enabled state searches for a printer connected to the same network and corresponding to the print plug-in itself using a predetermined protocol in response to an instruction from the print system 100. The printer search unit of each print plug-in notifies the detection result reception unit 105 of the print system 100 of a searched result.

In step S604, the print plug-in control unit 102 obtains the enabled or disabled state of each installed plug-in via the print plug-in management unit 104. In step S605, the print plug-in control unit 102 determines the enabled or disabled state obtained in step S604 to determine whether the print plug-in in the disabled state exists.

Figure 5A:
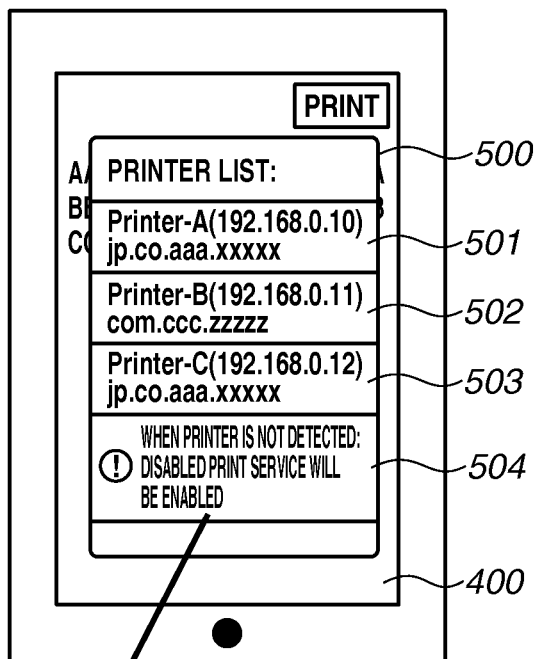
FIGS. 5A to 5C illustrate an example of screen transition according to a first exemplary embodiment.

In step S605, if it is determined that the print plug-in in the disabled state does not exist (NO in step S605), the processing proceeds to step S606, and the detection result reception unit 105 enters a waiting state for reception of a detection result notification from the print plug-in. Next, in step S607, the detection result reception unit 105 determines whether time has reached time-out. If it is determined that the time has not reached the time-out (NO in step S607), then in step S608, the detection result reception unit 105 determines whether the detection result notification is received from the print plug-in. In step S608, if the detection result reception unit 105 receives the result notified from the printer search unit of the print plug-in, it is determined that the detection result is received. If the detection result reception unit 105 receives the detection result notification (YES in step S608), the processing proceeds to step S609, and as illustrated in FIG. 5A, the UI unit 101 updates a printer list screen 500 and displays a printer detection result. Then, the processing proceeds to step S606. If printers are detected, printer information pieces and the print plug-ins which detected the printers are added to the printer list and displayed as illustrated in items 501 to 503 in FIG. 5A. In step S608, if the detection result reception unit 105 does not receive the detection result notification (NO in step S608), the processing returns to step S606.

On the other hand, in step S605, if it is determined that the print plug-in in the disabled state exists (YES in step S605), the processing proceeds to step S610. In step S610, the UI unit 101 adds, to the printer list screen 500 in FIG. 5A, a link button 504 to a print plug-in setting screen 510, and then the processing proceeds to step S606.

The processing in step S606 to step S609 is continued until it is determined that the time has reached the time-out in step S607, and then the printer list screen display processing is terminated.

Figure 5B:
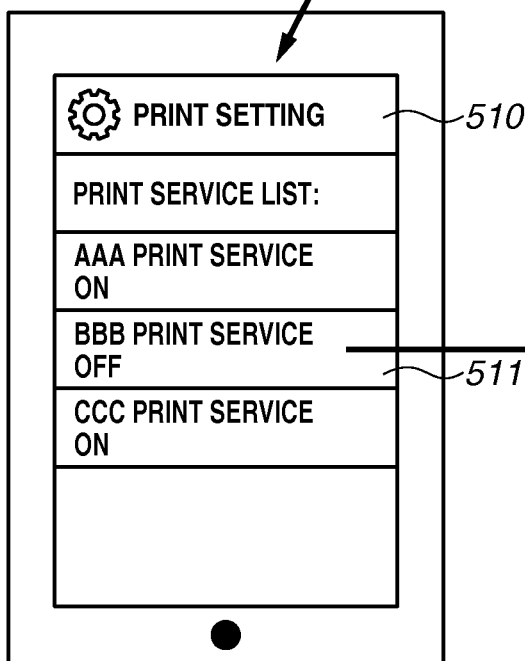
Figure 5C:
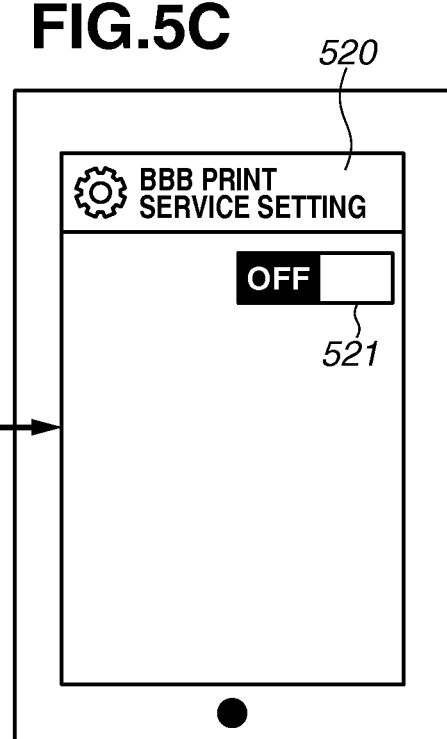

If a user inputs an instruction by tapping an area of the link button 504 to the print plug-in setting screen, the screen is shifted to the print plug-in setting screen 510 as illustrated in FIG. 5B, and the UI unit 101 displays a list of the installed print plug-ins. The print plug-in setting screen 510 is provided by a setting application installed as standard in the operating system. More specifically, the print plug-in setting screen 510 is a screen which can be accessed by launching the setting application. If the print plug-in is in the enabled state, "ON" is displayed, and is in the disabled state, "OFF" is displayed together with the name of the print plug-in. If an area of a BBB print service 511 in the disabled state is tapped in a plurality of print plug-ins (print services in the drawing), the screen is shifted to a setting screen 520 for switching the enabled or disabled state of the print plug-in as illustrated in FIG. 5C. If a button 521 is operated on the setting screen, the BBB print service in the disabled state can be changed to the enabled state, and when the setting is changed, the print plug-in management unit 104 stores the updated setting in the flash memory 2003. As described above, the operating system manages whether each of the plurality of print plug-ins is in the enabled state or in the disabled state by the print plug-in setting screen 510.

Accordingly, the BBB print service 511 in the disabled state can be easily changed to the enabled state, and a printer search and display of the detection result can be performed using the BBB print service 511.

According to a second exemplary embodiment, an example is described in which the print plug-in in the disabled state is changed to the enabled state in the printer list screen without shifting to the print plug-in setting screen.

FIGS. 8A and 8B are flowcharts illustrating an example of operations of the print system 100 performed after the target printer display area 403 is tapped on the print setting screen 402 illustrated in FIG. 4B. The processing same as in the already described step is denoted by the same reference numeral of the already described step and is not descried unless otherwise specified.

The processing described according to the present exemplary embodiment is realized by loading a program stored in the flash memory 2003 to the RAM 2002 and executing the program by the SoC 2001.

In step S605, if it is determined that the print plug-in in the disabled state exists (YES in step S605), the processing proceeds to step S810. In step S810, the UI unit 101 adds a print plug-in enabling button associated with the print plug-in determined in step S605 as in the disabled state to the printer list screen. According to the present exemplary embodiment, it is assumed that the print plug-in 210 is in the disabled state. Further, it is assumed that the print plug-in 210 is associated with a print plug-in enabling button 701. In such a case, in step S810, the print plug-in enabling button 701 is added to a printer list screen 700 as illustrated in FIG. 7A.

FIG. 8B illustrates processing of the print system 100 performed when the print plug-in enabling button 701 is tapped.

When the print plug-in enabling button 701 is tapped, in step S851, the print system 100 sets the print plug-in 210 associated with the print plug-in enabling button to the enabled state via the print plug-in management unit 104. As described above, the printer list screen according to the present exemplary embodiment has a function of notifying a user of existence of the print plug-in in the disabled state and a function as a setting screen for changing the enabled or disabled state of the print plug-in.

Next, in step S852, the print plug-in control unit 102 calls a printer search unit 211 of the print plug-in 210. As a result, the print plug-in 210 changed to the enabled state detects a Printer-D which is a printer corresponding to the print plug-in 210 itself, and in step S608 in FIG. 8A, it is determined that a detection result thereof is received. Accordingly, the detection result of the print plug-in 210 is added to the detection results originally displayed. In the example in FIG. 7B, the Printer-D is added to the detection results in FIG. 7A.

According to a third exemplary embodiment, a method is described which notifies, when display of a print setting screen is instructed and the print plug-in in the disabled state exists, existence of the print plug-in in the disabled state and displays a warning screen from which the print plug-in in the disabled state can be changed to the enabled state.

Processing when a list of printers on the network is displayed on a screen is described.

Figure 10:
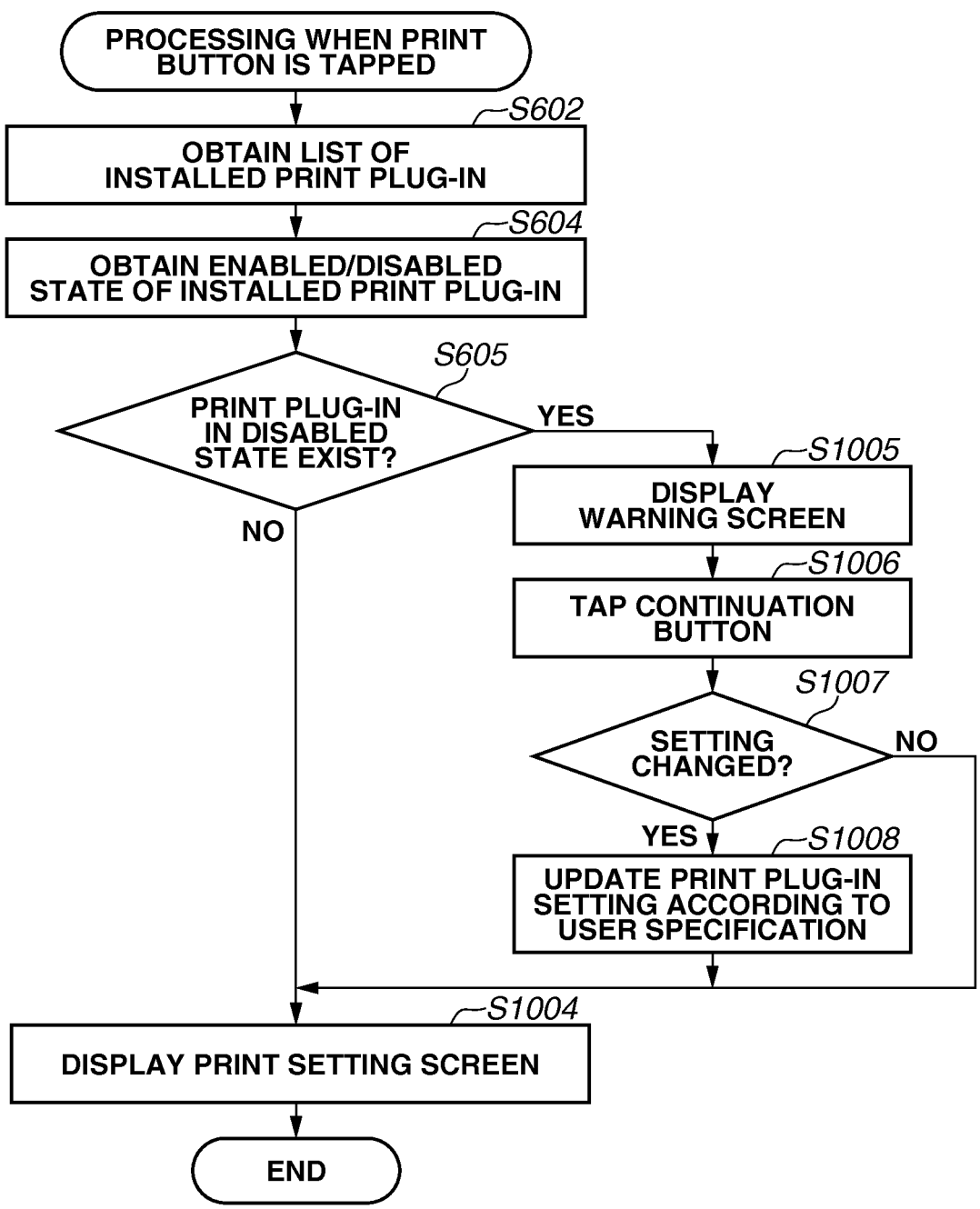
FIG. 10 is a flowchart illustrating processing performed when a print button is tapped according to the third exemplary embodiment.

FIG. 10 is a flowchart illustrating an example of operations of the print system 100 performed after the print button 401 of the application screen 400 illustrated in FIG. 4A is tapped. The processing same as in the already described step is denoted by the same reference numeral of the already described step and is not descried unless otherwise specified.

The processing described according to the present exemplary embodiment is realized by loading a program stored in the flash memory 2003 to the RAM 2002 and executing the program by the SoC 2001.

Figure 9:
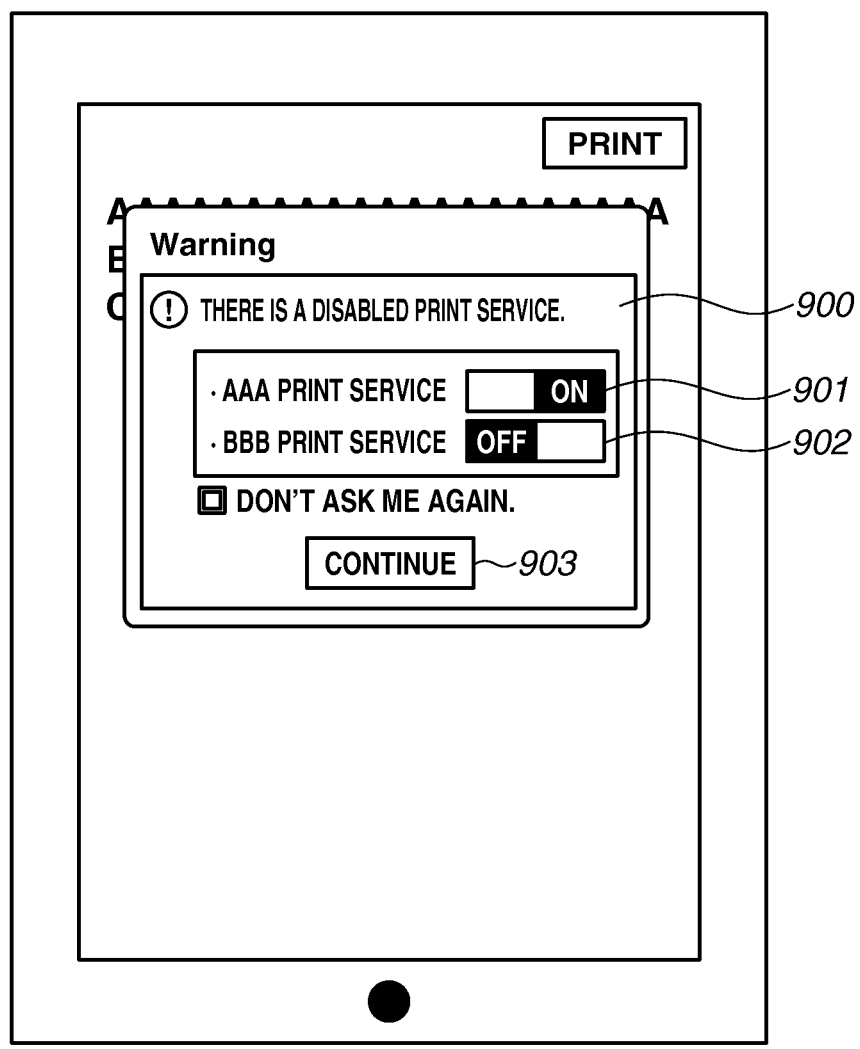
FIG. 9 illustrates an example of a setting screen according to a third exemplary embodiment.

In step S605, if it is determined that the print plug-in in the disabled state exists (YES in step S605), in step S1005, the UI unit 101 displays a warning screen 900 as illustrated in FIG. 9. The warning screen 900 displays a message, such as "There is a disabled print service." to notify a user of existence of the print plug-in in the disabled state. Further, the warning screen 900 has a function of displaying a message and a function as a setting screen for changing the enabled or disabled state of the installed print plug-ins including the print plug-in in the disabled state.

On the warning screen 900, the print plug-in setting buttons 901 and 902 are arranged for switching the enabled or disabled state of the respective installed print plug-ins. In step S1006, when a continuation button 903 on the warning screen 900 is tapped, then in step S1007, it is determined whether the setting on the warning screen 900 is changed.

The print plug-in setting button may be arranged only for the print plug-in in the disabled state on the warning screen 900.

In step S1007, if it is determined that the setting is changed (YES in step S1007), the processing proceeds to step S1008. In step S1008, the print system 100 changes the enabled or disabled state of each print plug-in via the print plug-in management unit 104 in response to the setting specified in the warning screen 900. After updating the enabled or disabled state of the print plug-in, the processing proceeds to step S1004. The UI unit 101 displays the print setting screen 402, and the processing is terminated.

On the other hand, if it is determined in step S1007 that the setting is not changed (NO in step S1007), or if it is determined in step S1003 that the print plug-in in the disabled state does not exist (NO in step S1003), the processing proceeds to step S1004 with doing nothing. The UI unit 101 displays the print setting screen 402, and the processing is terminated.

If a check box "Don't ask me again." as shown on the warning screen 900 is enabled and the continuation button 903 is tapped, the print plug-in to which the warning is issued on the warning screen 900 may not to be subjected to the processing for displaying the warning screen in step S1005 on the next and after.

According to the first to third exemplary embodiments, cases are described in which the print plug-in is installed in the portable terminal 2000 in the disabled state as a default state. According to a fourth exemplary embodiment, a method is described in which default launch information is described in a manifest, and the enabled state and the disabled state of the print plug-in is controlled according to the default launch information.

Figure 11:
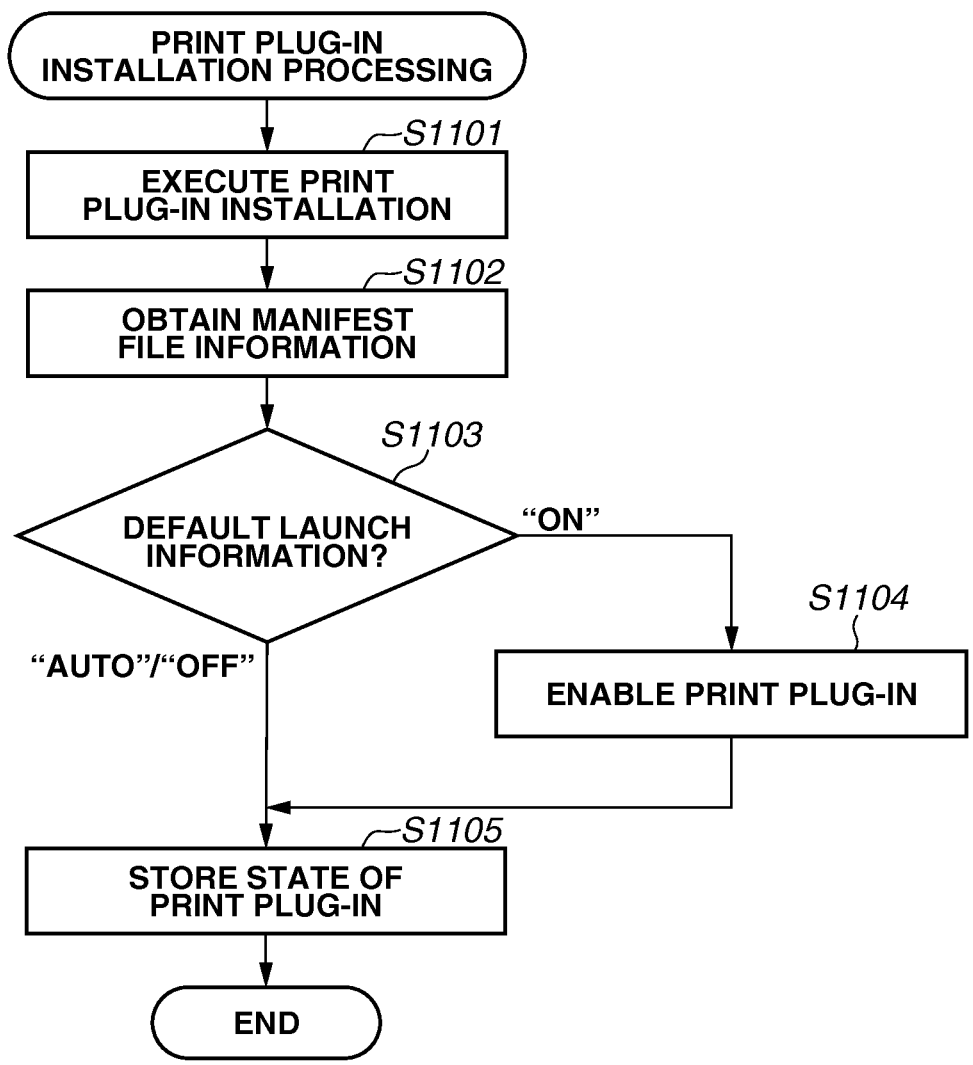
FIG. 11 is a flowchart illustrating print plug-in installation processing according to a fourth exemplary embodiment.

FIG. 11 is a flowchart illustrating an example of operations of the print system 100 performed when the print plug-in is installed in the portable terminal 2000.

The processing described according to the present exemplary embodiment is realized by loading a program stored in the flash memory 2003 to the RAM 2002 and executing the program by the SoC 2001.

First, in step S1101, an instruction to install the print plug-in is received from a user via an application delivery service on the Internet, and the print plug-in is installed in the portable terminal 2000. Next, in step S1102, the print plug-in management unit 104 of the print system 100 obtains information of a manifest file included in the package of the print plug-in.

Figure 12:
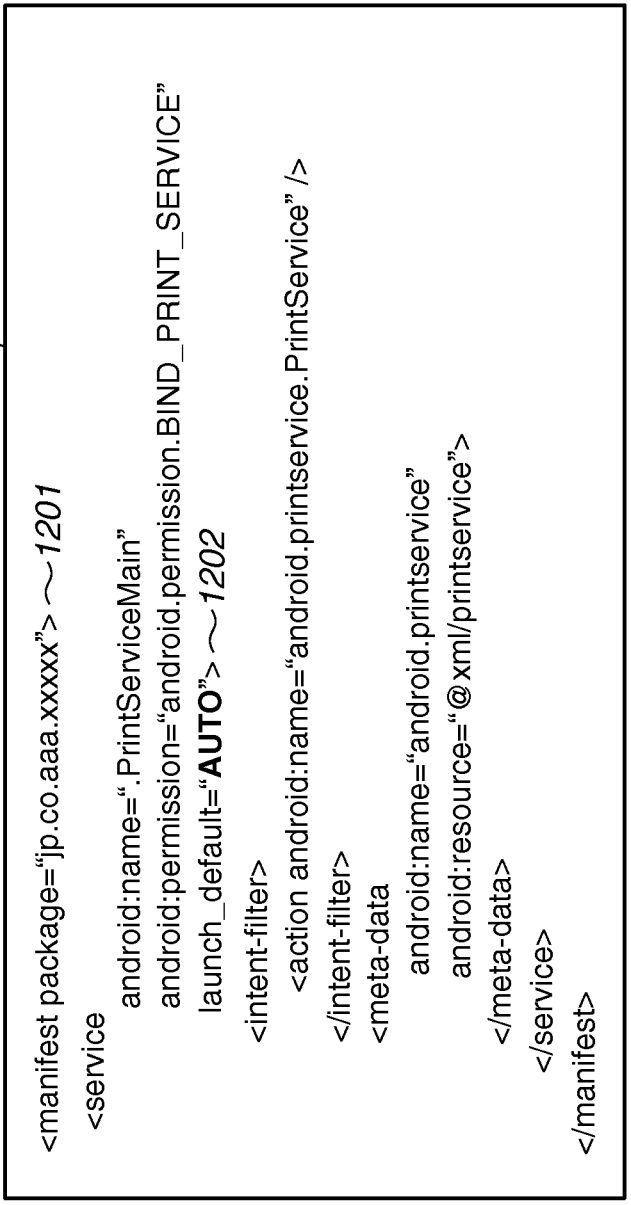
FIG. 12 illustrates an example of a manifest file according to the fourth exemplary embodiment.

FIG. 12 illustrates an example of a manifest file of the print plug-in 200. The manifest file is a file prepared for each print plug-in. A manifest file 1200 in FIG. 12 includes information regarding behavior of the print plug-in 200. According to the present exemplary embodiment, a package name 1201 and default launch information 1202 are included in the manifest file 1200. The default launch information 1202 specifies behavior of the print plug-in immediately after the installation, and three setting values, "ON", "OFF", and "AUTO" can be specified.

The three setting values are briefly described. "ON" corresponds to the enabled state according to the first to third exemplary embodiments, and "OFF" corresponds to the disabled state according to the first to third exemplary embodiments. When "ON" is specified in the manifest file, after the print plug-in including the relevant manifest file is installed, the print plug-in management unit 104 sets the installed print plug-in to the enabled state. On the other hand, when "OFF" or "AUTO" is specified, the installed print plug-in is set to the disabled state. However, when "AUTO" is specified, the print plug-in is set to the enabled state only in a first printer search. Then, if a printer detected by the print plug-in specified as "AUTO" is not selected by a user for a target printer, the print plug-in is changed to "OFF" as the disabled state.

Next, in step S1103, the print plug-in management unit 104 of the print system 100 determines the default launch information 1202 from the information of the manifest file obtained in step S1102. In step S1103, if it is determined that the default launch information is "ON" ("ON" in step S1103), the processing proceeds to step S1104. In step S1104, the print plug-in control unit 102 sets the print plug-in installed in step S1101 to the enabled state, and the processing proceeds to step S1105.

On the other hand, in step S1103, if it is determined that the default launch information is "OFF" or "AUTO" ("AUTO"/"ON" in step S1103), the processing proceeds to step S1105 with doing nothing.

In step S1105, the print plug-in management unit 104 stores the enabled or disabled state of the print plug-in in the flash memory 2003 according to the default launch information obtained in step S1102, and the processing is terminated.

Figure 14:
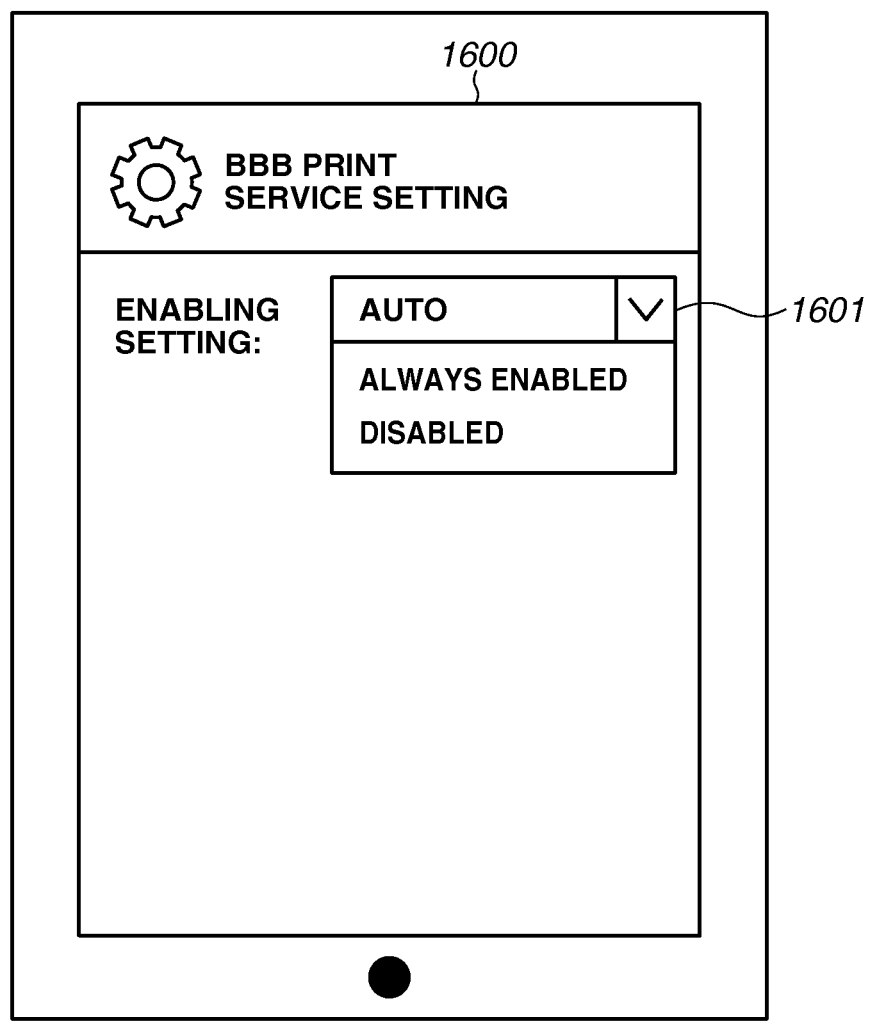
FIG. 14 illustrates an example of a print plug-in enabling setting screen according to the fourth exemplary embodiment.

FIG. 14 illustrates an example of a UI screen for setting the enabled state of the installed print plug-in. A print plug-in enabling setting screen 1600 is provided for each installed print plug-in and includes an enabling setting 1601. A default value of the enabling setting 1601 is the enabled or disabled state of the print plug-in stored in the flash memory 2003 in step S1105. Values can be set to the enabling setting 1601 are "Always enabled", "Disabled", and "Auto", and these setting values respectively correspond to "ON", "OFF", and "AUTO" which are specified in the default launch information 1202 of the manifest file described with reference to FIG. 12. When the setting is changed on the print plug-in enabling setting screen 1600, the print plug-in management unit 104 updates the setting of the enabled or disabled state stored in the flash memory 2003.

Figure 13:
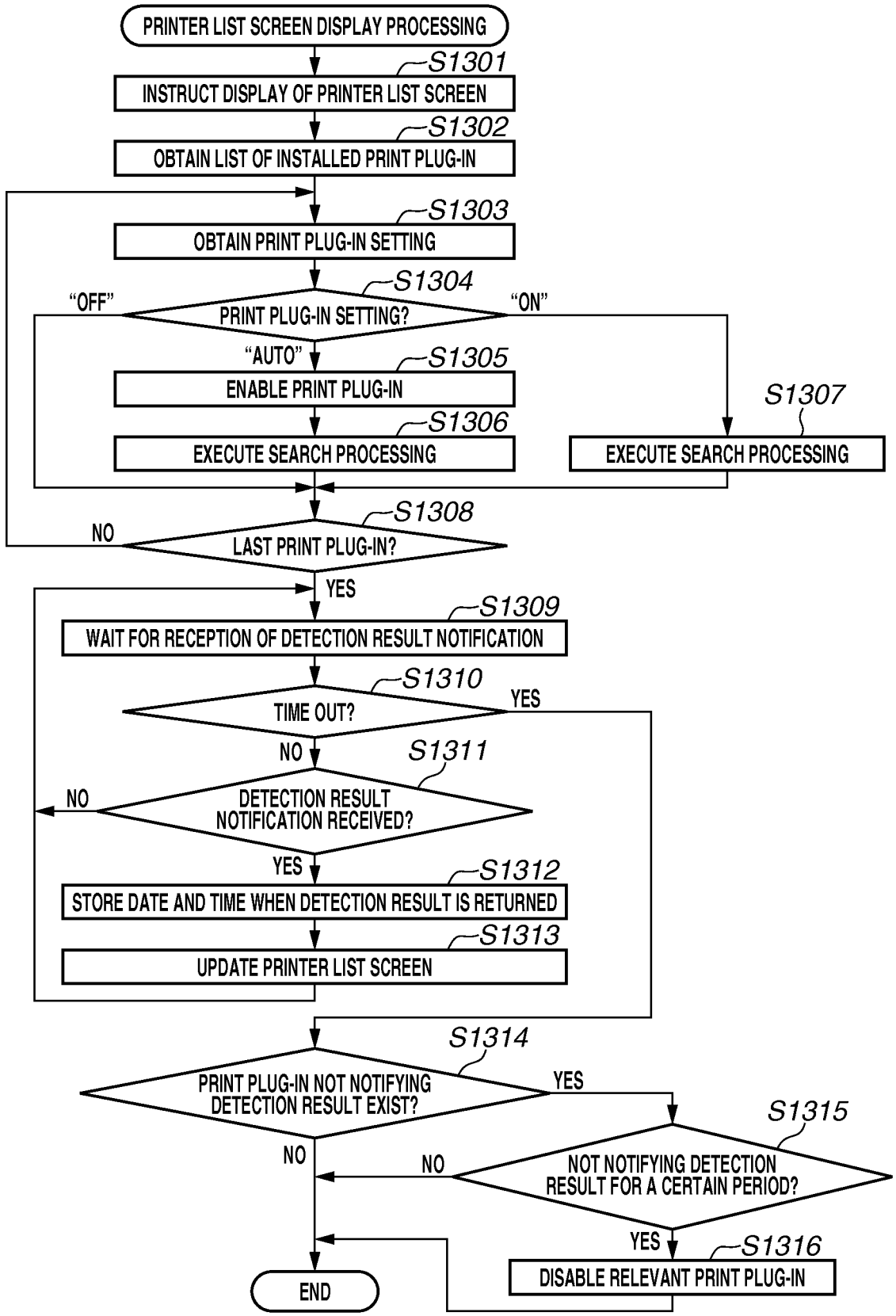
FIG. 13 is a flowchart illustrating printer list display processing according to the fourth exemplary embodiment.

FIG. 13 is a flowchart illustrating an example of operations of the print system 100 performed after the target printer display area 403 is tapped on the print setting screen 402 illustrated in FIG. 4B.

First, in step S1301, the target printer display area 403 is tapped on the print setting screen 402. Then, in step S1302, the print plug-in control unit 102 obtains the list of the print plug-ins installed in the portable terminal 2000 via the print plug-in management unit 104.

Next, in step S1303, the print plug-in control unit 102 obtains the setting of the enabled or disabled state of one print plug-in in the print plug-in list via the print plug-in management unit 104. In step S1304, the print plug-in control unit 102 determines the setting obtained in step S1303. In step S1304, if it is determined as the "OFF" state ("OFF" in step S1304), the processing proceeds to step S1308 with doing nothing. In step S1304, if it is determined as the "AUTO" state ("AUTO" in step S1304), the processing proceeds to step S1305, and the print plug-in management unit 104 sets the relevant print plug-in to the enabled state. Then, in step S1306, the print plug-in control unit 102 calls the printer search unit of the relevant print plug-in, and the processing proceeds to step S1308.

In step S1304, if it is determined as the "ON" state ("ON" in step S1304), in step S1307, the print plug-in control unit 102 calls the printer search unit of the relevant print plug-in, and the processing proceeds to step S1308.

Next, in step S1308, the print plug-in control unit 102 determines whether the print plug-in of which the setting is obtained in step S1303 is the last print plug-in in the print plug-in list.

In step S1308, if it is determined as the last print plug-in (YES in step S1308), the processing proceeds to step S1309. On the other hand, if it is determined as not the last print plug-in (NO in step S1308), the processing returns to step S1303, and the processing is repeated with respect to the installed print plug-ins in step S1308 until the print plug-in is determined as the last print plug-in.

In step S1309, the detection result reception unit 105 enters a waiting state for reception of a detection result notification from the print plug-in. Next, in step S1310, the detection result reception unit 105 determines whether time has reached time-out. If it is determined that the time has not reached the time-out (NO in step S1310), in step S1311, the detection result reception unit 105 determines whether the detection result notification is received from the print plug-in. In step S1311, if the detection result reception unit 105 receives the result notified from the printer search unit of the print plug-in, it is determined that the detection result is received. If the detection result reception unit 105 receives the detection result notification (YES in step S1311), the processing proceeds to step S1312. In step S1312, the print plug-in management unit 104 stores the package name and the detection result return date and time of the print plug-in which returned the detection result in the flash memory 2003. An example of information to be stored is as follows.
A print plug-in package name: jp.co.aaa.xxxxx
Detection result return date and time: 2014-10-10T15:39:24+00:00

The above-mentioned information pieces are managed for each print plug-in and overwritten every time the detection result is returned, and accordingly, the information indicates the last date and time that the print plug-in detected a printer.

If the print plug-in has never detected a printer, the date and time that the print plug-in was installed is stored.

Next, the processing proceeds to step S1313, and the UI unit 101 updates a printer list screen 702 as illustrated in FIG. 7B. Then, the processing proceeds to step S1309.

The processing in step S1309 to step S1313 is continued until it is determined that the time has reached the time-out in step S1310, and then the processing proceeds to step S1314.

In step S1314, the print plug-in control unit 102 determines whether there is the print plug-in which does not notify the detection result in the processing in step S1309 to step S1313 in the print plug-in list. In step S1314, if it is determined that there is the print plug-in which does not notify the detection result (YES in step S1314), the processing proceeds to step S1315, and the print plug-in management unit 104 determines whether there is the print plug-in which does not detect a printer for a certain period. In step S1315, whether the print plug-in detects a printer in the certain period or not can be determined by determining the detection result return date and time stored in step S1312.

Next, in step S1316, the print plug-in management unit 104 sets the print plug-in which is determined as not detect a printer for the certain period in step S1315 to the disabled state, and the processing is terminated.

On the other hand, in step S1314, if it is determined that there is no print plug-in which does not notify the detection result (NO in step S1314), the processing is terminated with doing nothing. Further, in step S1315, if it is determined that there is no print plug-in which does not detect a printer for the certain period (NO in step S1315), the processing is terminated with doing nothing.

FIG. 15 is a flowchart illustrating an example of operations of the print system 100 performed after the print button 405 of the application screen 400 illustrated in FIG. 4B is tapped. According to the present exemplary embodiment, an example is described when the print button 405 is tapped in a state in which a Printer-A detected by the print plug-in 200 is selected for a target printer.

First, in step S1501, the print plug-in control unit 102 obtains the list of the print plug-ins installed in the portable terminal 2000 via the print plug-in management unit 104.

Next, in step S1502, the print plug-in control unit 102 obtains the settings of the enabled or disabled state of the all print plug-ins via the print plug-in management unit 104. In step S1503, the settings of the enabled or disabled state obtained in step S1502 are determined, and the print plug-in management unit 104 sets the print plug-in to which "AUTO" is set other than the print plug-in 200 to the disabled state.

Next, in step S1504, the print plug-in control unit 102 calls the print processing unit 202 of the print plug-in 200, executes print processing to the target printer, and the processing is terminated.

According to the present invention, a print system is configured to notify that a print plug-in is in a disabled state or to install a print plug-in in an enabled state therein from the beginning, so that the print system highly convenient for users can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249438, filed Dec. 9, 2014, which is hereby incorporated by reference herein in its entirety.

What is claimed is:

1. An information processing apparatus having a first print plug-in capable of printer detection and a second print plug-in capable of printer detection, the information processing apparatus comprising:
   at least one memory that stores a set of instructions; and
   at least one processor that executes the instructions, the instructions, when executed, causing the information processing apparatus to perform operations comprising:
   disabling the first print plug-in;
   while the first print plug-in is in a disabled state and the second print plug-in is in an enabled state, receiving a user instruction for instructing the information processing apparatus to display information of detected printers; and
   in response to the reception of the user instruction for instructing the information processing apparatus to display the information of detected printers, displaying the information of printers detected by the second print plug-in in the enabled state with a message notifying existence of a disabled print plug-in.

2. The information processing apparatus according to claim 1, wherein the information includes names of the printers detected by the second print plug-in in the enabled state.

3. The information processing apparatus according to claim 1, wherein the operations further comprise:
   determining whether the plurality of print plug-ins includes a print plug-in in the disabled state, and
   displaying the message notifying existence of a disabled print plug-in in a case where it is determined that the plurality of print plug-ins includes the print plug-in in the disabled state.

4. The information processing apparatus according to claim 1, wherein the object corresponding to the detected printer with the message notifying the existence is displayed in a case that the printer is detected by the searching.

5. The information processing apparatus according to claim 1, wherein the other user instruction is a single user instruction for causing at least two print plug-ins in the enabled state to search for printers, and the instructing includes instructing the at least two print plug-ins in the enabled state to search for the printers in response to reception of the another user instruction.

6. The apparatus according to claim 1, wherein the operations further comprising:
   detecting a new printer by the second print plug-in in the enabled state; and
   in response to the detection of the new printer, updating the information on the display to include the detected new printer while the message is on the display.

7. The apparatus according to claim 1, wherein the operations further comprising:
   in response to a second user instruction according to the message, displaying the second print plug-in in the enabled state and the first print plug-in in the disabled state on the display.

8. The apparatus according to claim 1, wherein the operations further comprising:
   enabling the disabled first print plug-in in response to a third user instruction for instructing the apparatus to enable the disabled first print plug-in on the display.

9. The information processing apparatus according to claim 1, wherein the first print plug-in in the enabled state is capable of detecting a printer different from the printers, information of which is displayed.

10. The information processing apparatus according to claim 1, wherein the information of detected printers is a list of detected printers.

11. An information processing method comprising:
   installing a first print plug-in capable of printer detection;
   installing a second print plug-in capable of printer detection;
   disabling the first print plug-in;
   while the first print plug-in is in a disabled state and the second print plug-in is in an enabled state, receiving a user instruction for instructing an information processing apparatus to display information of detected printers; and
   in response to the reception of the user instruction for instructing the information processing apparatus to display the information of detected printers, displaying the information of printers detected by the second print plug-in in the enabled state with a message notifying existence of a disabled print plug-in.

12. The information processing method according to claim 11, wherein the information includes names of the printers detected by the second print plug-in in the enabled state.

13. The information processing method according to claim 11, further comprising:
   determining whether the plurality of print plug-ins includes a print plug-in in the disabled state; and
   displaying the message notifying existence of a disabled plug-in in a case where it is determined that the plurality of print plug-ins includes the print plug-in in the disabled state.

14. The method according to claim 11, further comprising:
   detecting a new printer by the second print plug-in in the enabled state; and
   in response to the detection of the new printer, updating the information on the display to include the detected new printer while the message is on the display.

15. The method according to claim 11, further comprising:
   in response to receiving a second user instruction according to the message, displaying the second print plug-in in the enabled state and the first print plug-in in the disabled state on the display.

16. The method according to claim 11, further comprising:
   enabling the disabled first print plug-in in response to a third user instruction for instructing the apparatus to enable the disabled first print plug-in on the display.

17. An information processing apparatus on which a first print plug-in capable of printer detection and a second print plug-in capable of printer detection can be installed, the information processing apparatus comprising:
   at least one memory that stores a set of instructions; and
   at least one processor that executes the instructions, the instructions, when executed, causing the information processing apparatus to perform operations comprising:
      receiving a user instruction for instructing the information processing apparatus to display information of detected printers;
      in response to the reception of the user instruction for instructing the information processing apparatus to display the information of detected printers while the second print plug-in has been installed and is in an enabled state and the first print plug-in has not been installed, displaying the information of printers detected by the second print plug-in without displaying a message notifying at least one print plug-in has not been installed; and
      in response to the reception of the user instruction for instructing the information processing apparatus to display the information of detected printers while the second print plug-in has been installed and is in the enabled state and the first print plug-in has been installed and is in the disabled state, displaying the information of printers detected by the second print plug-in with a message notifying at least one print plug-in is in the disabled state.

18. The information processing apparatus according to claim 17, wherein the operations further comprise not displaying the message notifying at least one print plug-in has not been installed regardless of whether the first print plug-in has been installed on the information processing apparatus.

19. The information processing apparatus according to claim 17, wherein the message notifying at least one print plug-in is in the disabled state is displayed based on the first print plug-in being in the disabled state.

20. The information processing apparatus according to claim 17, wherein the information of detected printer includes a name of the detected printer.

21. The information processing apparatus according to claim 17, wherein the first print plug-in in the disabled state is set into the enabled state based on another user's operation.

22. The information processing apparatus according to claim 17, wherein in a case where the first print plug-in is set into the enabled state, the information of detected printer that is not displayed in a case where the first print plug-in is in the disabled state is displayed.

23. An information processing apparatus on which a first print plug-in capable of printer detection and a second print plug-in capable of printer detection can be installed, the information processing apparatus comprising:

at least one memory that stores a set of instructions; and
at least one processor that executes the instructions, the instructions, when executed, causing the information processing apparatus to perform operations comprising:
receiving a user instruction for instructing the information processing apparatus to display information of detected printers;
in response to the reception of the user instruction for instructing the information processing apparatus to display the information of detected printers while the second print plug-in has been installed and is in an enabled state and the first print plug-in has not been installed, displaying the information of printers detected by the second print plug-in without displaying a message relating to the first print plug-in that has not been installed; and
in response to the reception of the user instruction for instructing the information processing apparatus to display the information of detected printers while the second print plug-in has been installed and is in the enabled state and the first print plug-in has been installed and is in the disabled state, displaying the information of printers detected by the second print plug-in with a message notifying at least one print plug-in is in the disabled state.

24. The information processing apparatus according to claim 23, wherein the operations further comprise:
not displaying the message relating to the first print plug-in that has not been installed regardless of whether the first print plug-in has been installed on the information processing apparatus.

25. The information processing apparatus according to claim 23, wherein the message notifying at least one print plug-in is in the disabled state is displayed based on the first print plug-in being in the disabled state.

26. The information processing apparatus according to claim 23, wherein the information of detected printer includes a name of the detected printer.

27. The information processing apparatus according to claim 23, wherein the first print plug-in in the disabled state is set into the enabled state based on another user's operation.

28. An information processing apparatus on which a plurality of print plug-ins, each of which is capable of printer detection can be installed comprising:

at least one memory that stores a set of instructions; and
at least one processor that executes the instructions, the instructions, when executed, causing the information processing apparatus to perform operations comprising:
receiving a user instruction for instructing the information processing apparatus to display information of detected printers;
in response to the reception of the user instruction for instructing the information processing apparatus to display the information of detected printers while an installed first print plug-in is in a disabled state and all installed print plug-ins other than the first print plug-in are in enabled states, displaying the information of printers detected by the all print plug-ins installed on the information processing apparatus with a message notifying at least one print plug-in is not in the enabled state; and
in response to the reception of the user instruction for instructing the information processing apparatus to display the information of detected printers while the first print plug-in has not been installed and all installed print plug-ins other than the first print plug-in are in enabled states, displaying the information of printers detected by the all print plug-ins installed on the information processing apparatus without the message notifying at least one print plug-in is not in the enabled state.

29. The information processing apparatus according to claim 28, wherein the first print plug-in installed on the information processing apparatus and in the disabled state is set into the enabled state based on another user's operation.

30. The information processing apparatus according to claim 28, wherein the information of printers detected by the other print plug-ins includes names of the printers detected by the other print plug-ins.

31. The information processing apparatus according to claim 28, wherein the first print plug-in displays the information of detected printers that is not displayed even if each of all print plug-ins installed on the information processing apparatus is in the enabled state.

* * * * *